(12) United States Patent
Black et al.

(10) Patent No.: US 8,888,029 B2
(45) Date of Patent: Nov. 18, 2014

(54) MILLING APPARATUS

(75) Inventors: Bryan Geoffrey Black, Auckland (NZ); Owen Ross Williams, Auckland (NZ)

(73) Assignee: MCD Technology Limited, Auckland (NZ)

( * ) Notice: Subject to any disclaimer, the term of this patent is extended or adjusted under 35 U.S.C. 154(b) by 0 days.

(21) Appl. No.: 13/482,361

(22) Filed: May 29, 2012

(65) Prior Publication Data

US 2013/0099033 A1   Apr. 25, 2013

Related U.S. Application Data

(63) Continuation of application No. 13/067,706, filed on Jun. 21, 2011, now abandoned, which is a continuation of application No. 12/705,394, filed on Feb. 12, 2010, now abandoned, which is a continuation of application No. 11/522,524, filed on Sep. 18, 2006, now abandoned.

(30) Foreign Application Priority Data

Mar. 15, 2006   (NZ) ........................... 545960

(51) Int. Cl.
   *B02C 9/04*       (2006.01)
   *B02C 21/00*      (2006.01)
   *B09C 1/00*       (2006.01)

(52) U.S. Cl.
   CPC ............... *B20C 23/00* (2013.01); *B20C 17/16* (2013.01); *B02C 21/007* (2013.01); *B09C 1/005* (2013.01); *B02C 21/00* (2013.01)
   USPC ................. 241/152.1; 241/152.2; 241/260.1

(58) Field of Classification Search
   USPC .............................. 241/152.2, 260.1
   See application file for complete search history.

(56) References Cited

U.S. PATENT DOCUMENTS

| | | | | |
|---|---|---|---|---|
| 645,422 A * | 3/1900 | Mellor | ........................ | 162/261 |
| 1,507,605 A | 9/1924 | Howe | | |
| 1,636,033 A * | 7/1927 | Agnew | ...................... | 241/188.1 |
| 1,864,973 A * | 6/1932 | Buchanan | .................. | 241/189.1 |
| 1,977,501 A * | 10/1934 | Townsend | .................. | 241/152.2 |
| 2,121,378 A | 6/1938 | Wilkinson | | |
| 2,208,077 A | 7/1940 | Linke | | |
| 2,571,300 A * | 10/1951 | Offenhauser | ............... | 241/101.8 |
| 2,622,855 A * | 12/1952 | Kulp et al. | ..................... | 366/134 |
| 3,059,862 A * | 10/1962 | Rich | ........................... | 241/152.2 |
| 3,212,723 A | 10/1965 | Maeder | | |
| 3,295,771 A | 1/1967 | Heinz | | |
| 3,527,419 A * | 9/1970 | Wienert | ........................ | 241/153 |
| 3,774,855 A | 11/1973 | Wolf | | |
| 4,098,465 A * | 7/1978 | Meller et al. | ..................... | 241/43 |
| 4,512,523 A * | 4/1985 | Higashimoto | ............... | 241/82.4 |
| 4,734,960 A | 4/1988 | Bougard | | |

(Continued)

FOREIGN PATENT DOCUMENTS

| | | |
|---|---|---|
| GB | 384736 | 12/1932 |
| WO | WO 01/83038 | 11/2001 |
| WO | WO 01/83127 | 11/2001 |
| WO | WO 02/072272 | 9/2002 |

*Primary Examiner* — Faye Francis
(74) *Attorney, Agent, or Firm* — Jacobson Holman Hershkovitz, PLLC.

(57) ABSTRACT

Milling apparatus suitable for mechano-chemical breakdown of contaminated media reliant upon housed ball mill units each able to be cradle mounted to receive a rotational drive of a shaft and to feed material downwardly from housing to housing.

5 Claims, 11 Drawing Sheets

(56) References Cited

U.S. PATENT DOCUMENTS

| | | |
|---|---|---|
| 4,738,402 A | 4/1988 | Downie |
| 4,840,315 A | 6/1989 | Rubin |
| 5,427,607 A | 6/1995 | Cristovici et al. ............... 75/749 |
| 5,645,229 A | 7/1997 | Spencer |
| 5,648,591 A | 7/1997 | Donecker et al. ............ 588/205 |
| 6,019,300 A | 2/2000 | Zoz |
| 6,158,680 A | 12/2000 | Ranne |
| 6,450,428 B1 | 9/2002 | Kelsey |
| 6,460,791 B1 | 10/2002 | Stehr |
| 6,648,251 B1 * | 11/2003 | Chollet ........................... 241/19 |
| 6,742,734 B2 | 6/2004 | Reed |
| 2004/0021021 A1 | 2/2004 | Ishikawa |
| 2004/0195413 A1 | 10/2004 | Reed |
| 2005/0040266 A1 | 2/2005 | Gerl |

\* cited by examiner

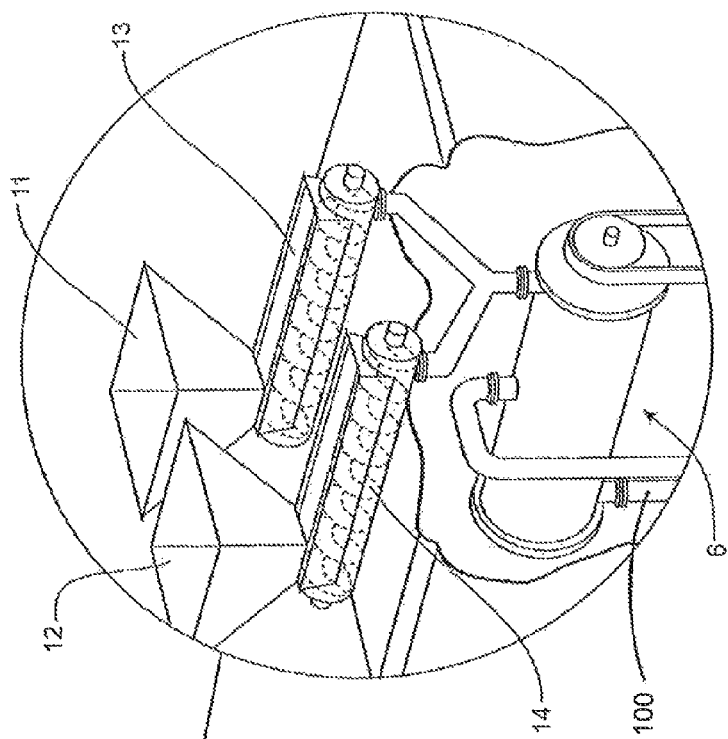
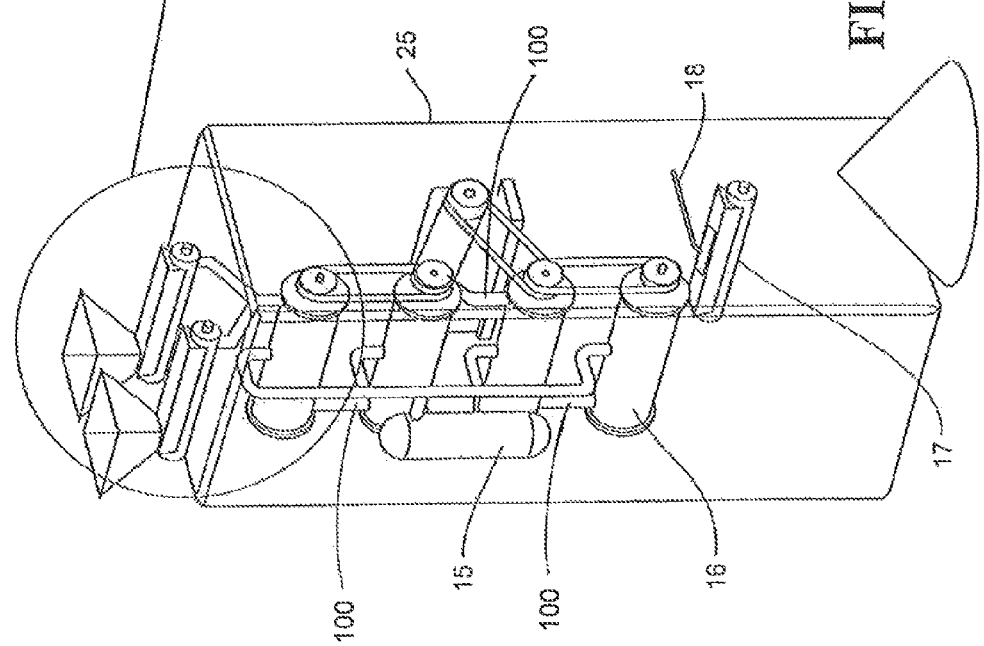
FIGURE 3
FIGURE 2

MILLING APPARATUS

CROSS-REFRENCE TO RELATED APPLICATION

This application is a Continuation Application of U.S. patent application Ser. No. 13/067,706 filed Jun. 21, 2011 now abandoned, which is a Continuation Application of U.S. patent application Ser. No. 12/705,394 filed Feb. 12, 2010 now abandoned, which is a Continuation Application of U.S. patent application Ser. No. 11/522,524 filed Sep. 18, 2006 now abandoned, which claims priority to New Zealand Application No. 545960, filed Mar. 15, 2006, all of which are incorporated by reference herein,

BACKGROUND F THE INVENTION

1. Field of the Invention

The present invention relates to milling apparatus.

The present invention in preferred forms relates to milling apparatus of a kind suitable for performing mechano-chemical or triboplasma reactions in respect of an infed solid material and/or optionally one or more reagents and/or catalysts. The invention therefore extends to plant, procedures and products of such plant usage and such procedures.

2. Description of Related Art

In our PCT Specifications WO0183038, WO0183127 and WO02072272 we disclose apparatus and methods for reducing the halo-organic content of a matrix such as a contaminated ground site. Involved in such a contaminated ground remedial procedure is the mechano-chemical modification of the halo organic content of part of a solid stream.

The full content of the aforementioned PCT specifications is hereby here included by way of reference. Also included are those specifications themselves internally referenced in such specifications.

BRIEF SUMMARY OF THE INVENTION

The present invention has as one object, or an alternative object, better reactivity owing to preferably higher kinetic energies of the material impacting impact elements (usually balls) in the reining apparatus.

Another or alternative object is to effect mechano-chemical milling by the input of energy merely to rotate a substantially horizontally aligned agitation member or assembly.

Another or alternative object is to reduce energy inputs required for a materials through put.

At least one of these objects is achievable by reliance upon a shaft which carries (preferably separately fitted and sacrificial) agitated forms ("agitators") which rotate with the shaft. Such agitators can have a variety of different actions including flinging. Such agitators also can be adapted to cause a gradual migration of solids material in a direction parallel to the rotational axis of the shaft thereby to maximise or increase dwell time in the milling apparatus between an inlet and an outlet.

We have also found that the wear on agitators does require frequent downtime. The agitator forms tend to erode quicker than any balls (usually of steel) or other impact elements confined to be agitated by the agitators.

Downtime, if to be kept to the minimum, requires the milling apparatus be of a kind that can be readily serviced.

It is another or alternative object of the present invention to allow a speedy servicing of the milling apparatus preferably by removal and modular replacement or by removal, servicing and it then being returned.

We have determined that in some embodiments of the present invention, a tower of a gang of separate milling apparatus that feed, preferably with the assistance of gravity, from one to the other, etc can have the individual milling apparatus quickly replaced.

Having however determined advantages in such an application milling apparatus of the present invention has more widespread application and can be used for a variety of different uses.

In an aspect the invention relates to a ready to go (preferably stack insertable) ball mill to operate with horizontally aligned shafted agitator forms (and preferably under the action of a shaft coupler).

Preferably the mill includes balls as impact elements.

Preferably the ball mill has a housing for the balls (or other impact elements) and a rotatable shaft through the housing on bearings to allow the shaft to be rotated, the shaft having agitator forms (e.g. flingers) carried thereon to rotate therewith.

Preferably the agitator forms have sleeves to key to the shaft

Preferably the shaft has a coupler to receive the complementary couplet of a drive.

Preferably the housing is cylindrical with ends, the ends having said bearings.

Preferably there is at least one inlet and at least one outlet to the housing.

Preferably the milling is conducted with bells rather than deviations in shape therefrom (e.g. barrels).

Preferably the balls are a same initial size prior use. Preferably that initial size is in the diameter range of from 5 to 40 mm (more preferably 8 to 25 mm and most preferably from about 12 mm to about 20 mm).

In another aspect the invention is in combination, a ball mill as aforesaid, a mount to cradle the housing yet to allow shaft rotation when and/or if the housing is fixed in the cradle, and a coupler of a drive to couple to the shaft so as to drive, in use, the cradle mounted ball mill by rotating the coupled shaft.

Preferably said drive can be operated or configured to allow rotation in either direction.

Preferably there is a material feed inlet connectable to a material feed from above and/or a material outfeed to feed to below.

Preferably there is provision for a gas feed into the housing.

Preferably the milling is conducted with bells rather than deviations in shape therefrom (e.g. barrels).

Preferably the balls are a same initial size prior use. Preferably that initial size is in the diameter range of from 5 to 40 mm (more preferably 8 to 25 mm and most preferably from about 12 mm to about 20 mm).

In another aspect the invention is a combination as aforesaid in an operative form.

Preferably the combination includes ready for fitment a stand-by ready to go ball mill.

In an aspect the present invention consists in milling apparatus comprising or including a shaft having a drive coupling and carrying agitator forms ("agitators") to rotate with the shaft, a drum or other chamber defining means ("drum") about the agitators on part of the length of the shaft thereby defining a chamber containing or to contain impact elements to be energised by agitation, the drum having an inlet and an outlet for process stream material(s), a drive having a drive coupling to complement that of the shaft, a support for the shafted drum which enables the drive via the coupled couplings to rotate at least the shaft and its agitators about the shaft axis when it is substantially horizontal, and optionally the impact elements (e.g. ball, barrels, pins and/or the like masses).

The drum may rotate with the shaft. Preferably the drum is not to be or is not in rotational synchrony with the shaft (i.e. preferably it is fixed (e.g. by ties, belts or the like) in a cradle that at least stirs the shaft.

The agitators are static forms carried by the shaft and may act to fling impact masses about within the drum.

Preferably within the drum is a partition whereby impact elements to be retained can not access a said outlet but finer material(s) can. Preferably the partition is a screen fixed or carried, or both, by one or other of the drum and the shaft.

Preferably said drive can be operated or configured to allow rotation in either direction. Preferably the milling is conducted with bells rather than deviations in shape therefrom (e.g. barrels).

Preferably the balls are a same initial size prior use. Preferably that initial size is in the diameter range of from 5 to 40 mm (more preferably 8 to 25 mm and most preferably from about 12 mm to about 20 mm)

In another aspect the present invention consists in milling apparatus comprising or including a shaft having a drive coupling, agitator forms ("agitators") sleeved on the shaft to rotate with the shaft, a drum or other chamber defining means ("drum") about the agitators on part of the length of the shaft thereby defining a chamber containing or to contain impact elements to be energised by agitation, the drum having an inlet and an outlet for process stream material(s), a drive having a drive coupling to complement that of the shaft, a support for the shafted drum which enables the drive via the coupled couplings to rotate at least the shaft and its agitators about the shaft axis when it is substantially horizontal, and optionally the impact elements (e.g. ball, barrels, pins and/or the like masses).

Preferably the agitator forms sleeve with a sleeve providing opening correspondence to a non round sectioned part of the shaft so as to derive a rotational drive therefrom.

The drum may rotate with the shaft. Preferably the drum is not to be or is not in rotational synchrony with the shaft (i.e. preferably it is fixed (e.g. by ties, belts or the like) in a cradle that at least aligns the shaft.

Preferably said drive can be operated ox configured to allow rotation in either direction.

The agitators are static forms carried by the shaft and may act to fling impact masses about within the drum.

Preferably within the drum is a partition whereby impact elements to be retained can not access a said outlet but finer material(s) can. Preferably the partition is a screen fixed or carried, or both, by one or other of the drum and the shaft Preferably the milling is conducted with balls rather than deviations in shape therefrom (e.g. barrels).

Preferably the balls are a same initial size prior use. Preferably that initial size is in the diameter range of from 5 to 40 mm (more preferably 8 to 25 mm and most preferably from about 12 mm to about 20 mm).

In yet another aspect the present invention consists in horizontally shafted milling apparatus comprising or including a shaft having a drive coupling and carrying agitator forms ("agitators") to rotate with the shaft, a drum or other chamber defining means ("drum") about the agitators on part of the length of the shaft thereby defining a chamber containing or to contain impact elements to be energised by agitation, the drum having an inlet and an outlet for process stream material(s), a drive having a drive coupling to complement that of the shaft, a support for the shafted drum which enables the drive via the coupled couplings to rotate at least the shaft and its agitators about the shaft axis, and optionally the impact elements (e.g. ball, barrels, pins and/or the like masses).

Preferably the mining is conducted with bells rather than deviations in shape therefrom (e.g. barrels).

Preferably the balls are a same initial size prior use. Preferably that initial size is in the diameter range of from 5 to 40 mm (more preferably 8 to 25 mm and most preferably from about 12 mm to about 20 mm).

In an aspect the present invention consists in milling apparatus comprising or including a shaft having a drive coupling and carrying agitator forms ("agitators") to rotate with the shaft, a drum or other chamber defining means ("drum") about the agitators on part of the length of the shaft thereby defining a chamber containing or to contain impact elements to be energised by agitation, the drum having an inlet and an outlet for process stream material(s), a drive having a drive coupling to complement that of the shaft, a support for the shafted drum which enables the drive via the coupled couplings to rotate at least the shaft and its agitators about the shaft axis, and optionally the impact elements (e.g. ball, barrels, pins and/or the like masses).

Preferably the milling is conducted with balls rather than deviations in shape therefrom (e.g. barrels).

Preferably the balls are a same initial size prior use. Preferably that initial size is in the diameter range of from 5 to 40 mm (more preferably 8 to 25 mm and most preferably from about 12 mm to about 20 mm).

The drum may rotate with the shaft. Preferably the drum is not to be or is not in rotational synchrony with the shaft (i.e. preferably it is fixed (e.g. by ties, belts or the like) in a cradle that at least aligns the shaft.

Preferably said drive can be operated or configured to allow rotation in either direction.

In another aspect the present invention consists in an assembly providing part or to provide parts of a mining apparatus comprising or including a shaft having a drive coupling and carrying agitator forms ("agitators") to rotate with the shaft, and a drum or other chamber defining means ("drum") about the agitators on part of the length of the shaft thereby defining a chamber containing or to contain impact elements to be energised by agitation, the drum having an inlet and an outlet for process stream material(s), the shaft preferably to be rotated substantially horizontally.

The drum may rotate with the shaft. Preferably the drum is not to be or is not in rotational synchrony with the shaft (i.e. preferably it is fixed (e.g. by ties, belts or the like) in a cradle that at least aligns the shaft.

Preferably said drive can be operated or configured to allow rotation in either direction.

The agitators are static forms carried by the shaft and may act to fling impact masses about within the drum.

Preferably within the drum is a partition whereby impact elements to be retained can not access a said outlet but finer materials) can. Preferably the partition is a screen fixed or carried, or both, by one or other of the drum and the shaft In another aspect the present invention consists in milling apparatus comprising or including a shaft having a drive coupling and carrying agitator forms ("agitators") to rotate with the shaft, a drum or other chamber defining means ("drum") about the agitators on part of the length of the shaft thereby defining a chamber containing or to contain impact elements to be energised by agitation, the drum having an inlet to receive a feed from above to discharge to below when appropriately operated with the shaft at least substantially horizontal and an outlet, a drive having a drive coupling to complement that of the shaft, a support for the shafted drum which enables the drive via the coupled couplings to rotate at least the shaft and its agitators about the shaft axis, and optionally the impact elements (e.g. ball, barrels, pins and/or the like masses).

The drum may rotate with the shaft. Preferably the drum is not to be rotated or is not in rotational synchrony with the shaft (i.e. preferably it is fixed (e.g. by ties, belts or the like) in a cradle that at least aligns the shaft.

Preferably said drive can be operated or configured to allow rotation in either direction.

The agitators are static forms carried by the shaft and may act to fling impact masses about within the drum.

Preferably within the drum is a partition whereby impact elements to be retained can not access a said outlet but finer material(s) can. Preferably the partition is a screen fixed or carried, or both, by one or other of the drum and the shaft.

Preferably the milling is conducted with balls rather than deviations in shape therefrom (e.g. barrels).

Preferably the balls are a same initial size prior use. Preferably that initial size is in the diameter range of from 5 to 40 mm (more preferably 8 to 25 mm and most preferably from about 12 mm to about 20 mm).

In another aspect the invention is in combination, a ball mill as aforesaid, a mount to cradle the housing yet to allow shaft rotation when and/or if the housing is fixed or is stable in the cradle, and a coupler of a drive to couple to the shaft so as to drive, in use, the cradle mounted ball mill by rotating the coupled shaft.

Preferably said drive can be operated or configured to allow rotation in either direction.

Preferably there is a material feed inlet connectable to a material feed from above and/or a material outfeed to feed to below.

Preferably there is provision for a gas feed into the housing.

In another aspect the invention is a combination as aforesaid in an operative form.

Preferably the combination includes ready for fitment a stand-by ready to go ball mill.

In an aspect the present invention consists, in a gang of milling apparatus where at least one feeds material to another, milling apparatus comprising or including a shaft having a drive coupling and carrying agitator forms ("agitators") to rotate with the shaft, a drum or other chamber defining means ("drum") about the agitators on part of the length of the shaft thereby defining a chamber containing or to contain impact elements to be energised by agitation, the drum having an inlet and an outlet for process stream material(s), and optionally the impact elements (e.g. ball, barrels, pins and/or the like masses).

The drum may rotate with the shaft. Preferably the drum is not to be or is not in rotational synchrony with the shaft (i.e. preferably it is fixed (e.g. by ties, belts or the like) in a cradle that at least aligns the shaft.

Preferably said drive can be operated or configured to allow rotation in either direction.

Preferably the gang of milling apparatus or plurality of shafted chambers/drums has one or more of:

an enclosure (e.g. for containment of sound, dust or the like)

a support frame or tower a belt or flexible drive to each shaft via its shaft coupling bearing supports of the shaft in or by the drum removable agitators (e.g. preferably cast) from the shafts non circular sleeving of the agitators on the shaft in order to cause synchronous rotation staggering of like agitators as to rotational position along the shaft a shaft coupling complementary coupling to not be removable necessarily with the shaft and its coupling steel balls as impact elements pairs of milling apparatus aligned inlet to outlet so that a material flow can be achieved with a small footprint (i.e. the material moves backwards and forwards)

a cradle mounting for the shaft of each milling apparatus/shafted drum, a drive to rotate the shaft(s) in either direction.

Preferably the milling is conducted with balls rather than deviations in shape therefrom (e.g. barrels).

Preferably the balls are a same initial size prior use. Preferably that initial size is in the diameter range of from 5 to 40 mm (more preferably 8 to 25 mm and most preferably from about 12 mm to about 20 mm).

In another aspect the invention is mining apparatus comprising or including a plurality shafted chambers containing impact masses capable of being energised by agitator formations carried by each shaft when rotated, each chamber having an inlet and an outlet, and a drive or drives to rotate the shafts, wherein an inlet of a first said chamber can receive a solids stream and its outlet can discharge to an inlet of a second said chamber and the outlet of that second chamber can discharge either (I) for harvesting the out put or (II) to an inlet of a third said chamber, etc.

The drum may rotate with the shaft. Preferably the drum is not to be or is not in rotational synchrony with the shaft (i.e. preferably it is fixed (e.g. by ties, belts or the like) in a cradle that at least aligns the shaft.

Preferably said drive can be operated or configured to allow rotation in either direction.

Preferably the plurality of shafted chambers/drums has one or more of.

an enclosure (e.g. for containment of sound, dust or the like)

a support frame or tower a belt or flexible drive to each shaft via its shaft coupling bearing supports of the shaft in or by the drum removable agitators (e.g. preferably cast) from the shafts non circular sleeving of the agitators on the shaft in order to cause synchronous rotation staggering of like agitators as to rotational position along the shaft a shaft coupling complementary coupling to not be removable necessarily with the shaft and its coupling steel balls as impact elements pairs of milling apparatus aligned inlet to outlet so that a material flow can be achieved with a Small footprint (i.e. the material moves backwards and forwards)

a cradle mounting for the shaft of each milling apparatus/shafted drum.

Preferably the milling is conducted with balls rather than deviations in shape therefrom (e.g. barrels).

Preferably the balls are a same initial size prior use. Preferably that initial size is in the diameter range of from 5 to 40 mm (more preferably 8 to 25 mm and most preferably from about 12 mm to about 20 mm).

In another aspect the invention is in combination, a ball mill as aforesaid, a mount to cradle the housing yet to allow shaft rotation when and/or if the housing is fixed in the cradle, and a coupler of a drive to couple to the shaft so as to drive, in use, the cradle mounted ball mill by rotating the coupled shaft.

Preferably said drive can be operated or configured to allow rotation in either direction.

Preferably there is a material feed inlet connectable to a material feed from above and/or a material outfeed to feed to below.

Preferably there is provision for a gas feed into the housing.

In another aspect the invention is a combination as aforesaid in an operative form.

Preferably the combination includes ready for fitment a stand-by ready to go ball mill.

In another aspect the invention is mining apparatus comprising or including a plurality shafted chambers of impact masses capable of being energised by agitator formations carried by each shaft when rotated, each chamber having an inlet and an outlet, and a ganged drive to rotate the shafts, wherein an inlet of a first said chamber can receive a solids stream and its outlet can discharge to an inlet of a second said chamber and the outlet of that second chamber can discharge either (I) for harvesting the out put or (II) to an inlet of a third said chamber, etc.

Preferably the ganged drive is by belt or other flexible drive to each shaft

The drum may rotate with the shaft. Preferably the drum is not to be rotated or is not in rotational synchrony with the shaft (i.e. preferably it is fixed (e.g. by ties, belts or the like) in a cradle that at least aligns the shaft.

Preferably said drive can be operated or configured to allow rotation in either direction.

Preferably each shaft can be disconnected for removal (preferably with its chamber) from the drive input to each shaft.

Preferably the gang of shafted chambers/drams has one or more of:

an enclosure (e.g. for containment of sound, dust or the like)

a support frame or tower a belt or flexible drive to each shaft via its shaft coupling bearing supports of the shaft in or by the drum removable agitators (e.g. preferably cast) from the shafts non circular sleeving of the agitators on the shaft in order to cause synchronous rotation staggering of like agitators as to rotational position along the shaft a shaft coupling complementary coupling to not be removable necessarily with the shaft and its coupling steel balls as impact elements pairs of Milling apparatus aligned inlet to outlet so that a material flow can be achieved with a small footprint (i.e. the material moves backwards and forwards)

a cradle mounting for the shaft of each milling apparatus/shafted drum.

Preferably the milling is conducted with balls rather than deviations in shape therefrom (e.g. barrels).

Preferably the balls axe a same initial size prior use. Preferably that initial size is in the diameter range of from 5 to 40 mm (more preferably 8 to 25 mm and most preferably from about 12 mm to about 20 mm).

In another aspect the invention is in combination, a ball mill as aforesaid, a mount to cradle the housing yet to allow shaft rotation when and/or if the housing is fixed in the cradle, and a coupler of a drive to couple to the shaft so as to drive, in use, the cradle mounted ball mill by rotating the coupled shaft Preferably said drive can be operated or configured to allow rotation in either direction.

Preferably there is a material feed inlet connectable to a material feed from above and/or a material outfeed to feed to below.

Preferably there is provision for a gas feed into the housing.

In another aspect the invention is a combination as aforesaid in an operative form.

Preferably the combination includes ready for fitment a stand-by ready to go ball mill In another aspect the invention is mining apparatus comprising or including a plurality shafted chambers or drums ("chambers") of impact masses capable of being energised by agitator formations carried by each shaft when rotated, each chamber having an inlet and an outlet, and a drive or drives to rotate each of the shafts via a drive input, wherein an inlet of a first said chamber can receive a solids stream and its outlet can discharge to an inlet of a second said chamber and the outlet of that second chamber can discharge either (I) for harvesting the out put or (II) to an inlet of a third said chamber, etc, and wherein each shaft can be disconnected for removal (preferably with its chamber) from its drive input.

The drum may rotate with the shaft. Preferably the drum is not to be or is not in rotational synchrony with the shaft (i.e. preferably it is fixed (e.g. by ties, belts or the like) in a cradle that at least aligns the shaft.

Preferably said drive can be operated or configured to allow rotation in either direction.

Preferably the gang of milling apparatus or plurality of shafted chambers/drums has one or more of:

an enclosure (e.g. for containment of sound, dust or the like)

a support frame or tower a belt or flexible drive to each shaft via its shaft coupling bearing supports of the shaft in or by the drum removable agitators (e.g. preferably cast) from the shafts non circular sleeving of the agitators on the shaft in order to cause synchronous rotation staggering of like agitators as to rotational position along the shaft a shaft coupling complementary coupling to not be removable necessarily with the shaft and its coupling steel balls as impact elements pairs of milling apparatus aligned inlet to outlet so that a material flow can be achieved with a small footprint (i.e. the material moves backwards and forwards)

a cradle mounting for the shaft of each milling apparatus/shafted drum.

In another aspect the invention is in combination,
a ball mill as aforesaid,
a mount to cradle the housing yet to allow shaft rotation when and/or if the housing is fixed in the cradle, and
a coupler of a drive to couple to the shaft so as to drive, in use, the cradle mounted ball mill by rotating the coupled shaft.

Preferably said drive can be operated or configured to allow rotation in either direction.

Preferably there is a material feed inlet connectable to a material feed from above and/or a material outfeed to feed to below.

Preferably there is provision for a gas feed into the housing.

In another aspect the invention is a combination as aforesaid in an operative form.

Preferably the combination includes ready for fitment a stand-by ready to go ball mill.

In another aspect the invention is milling apparatus comprising or including
a plurality shafted chambers of impact masses capable of being energised by agitator formations carried by each shaft when rotated, each chamber having an inlet and an outlet, and a drive or drives to rotate the shafts,
wherein an inlet of a first said chamber can receive a solids stream and its outlet can discharge to an inlet of a second said chamber and the outlet of that second chamber can discharge either (I) for harvesting the out put or (II) to an inlet of a third said chamber, etc,
and wherein each shafted chamber as a unit can be replaced by uncradling and/or disconnection from its drive input.

Preferably the gang of milling apparatus or plurality of shafted chambers/drums has one or more of:
an enclosure (e.g. for containment of sound, dust or the like)
a support frame or tower
a belt or flexible drive to each shaft via its shaft coupling
bearing supports of the shaft in or by the drum
removable agitators (e.g. preferably cast) from the shafts
non circular sleeving of the agitators on the shaft in order to cause synchronous rotation
staggering of like agitators as to rotational position along the shaft
a shaft coupling complementary coupling to not be removable necessarily with the shaft and its coupling
steel balls as impact elements
pairs of milling apparatus aligned inlet to outlet so that a material flow can be achieved with a small footprint (i.e. the material moves backwards and forwards)
a cradle mounting for the shaft of each milling apparatus/ shafted drum.

In another aspect the invention is in combination,
a ball mill as aforesaid,
a mount to cradle the housing yet to allow shaft rotation when and/or if the housing is fixed in the cradle, and
a coupler of a drive to couple to the shaft so as to drive, in use, the cradle mounted ball mill by rotating the coupled shaft Preferably said drive can be operated or configured to allow rotation in either direction.

Preferably there is a material feed inlet connectable to a material feed from above and/or a material outfeed to feed to below.

Preferably there is provision for a gas feed into the housing.

In another aspect the invention is a combination as aforesaid in an operative form.

Preferably the combination includes ready for fitment a stand-by ready to go ball mill.

In another aspect the invention is a method of reducing the level of at least one organo-halogen compound in and/or on a matrix which comprises or involves milling at least the matrix with said at least one organo-halogen compound in milling apparatus in any one or more of the aspects aforesaid.

Preferably the ball mill operation is such that a temperature of at least substantially 70° C. is generated in the ball mill mix.

The matrix can be all of, or a sized stream of, organo-halogen contaminated earth, soil, clay and/or rock pieces.

Preferably the matrix has been dried prior to milling. Such drying is preferably at less than 60° C. in a drier at less than 125° C.

Preferably the matrix has not been washed prior to milling.

In still another aspect the invention is method of reducing the halo-organic content of a contaminated ground site which comprises or includes the steps of
excavating the contaminated site to derive contaminated media therefrom;
streaming at least part of the contaminated media on a particle size basis to derive, relative to each other, (a) a larger particle size stream and (b) a smaller particle size stream, the larger particle size stream on a weight to weight bas's being less halo-organic content contaminated than the smaller particle size stream;
subjecting the smaller particle size stream to a mechano-chemical milling procedure in the milling apparatus of any aspect of the present invention (optionally with a suitable reactive agent or suitable reactive agents) thereby to reduce the halo-organic content of the smaller particle size stream;
subjecting (I) the resultant mix of milled materials from that milling procedure and (II) at least part of the larger particle size stream of that streaming procedure (optionally after washing thereof) to a blending procedure thereby to provide a blend which includes particle sizes larger than those of the milled materials; and
either (i) reinstating the excavated site at least in part with that blend or (v) reinstating the excavated site with other fill prior to, whilst and/or after disposing of that blend elsewhere.

The more contaminated smaller particle size stream may have an average particle size of 10 mm or less.

The smaller particle size stream may be derived by one or both of screening and/or identification the media as day.

Preferably the milling is to submicron sizes.

At least the more contaminated smaller particle size stream may have been subjected to a drying procedure prior to milling. Preferably the drying has been of an unwashed solids stream.

Reactive agent or agents are preferably used in at least some of the milling.

The suitable reactive agent(s) and the milled materials are at least primarily solids e.g. quartz sand and the soil.

Preferably the milling is with a ball mill of the present invention.

The blend is preferably used for site reinstatement

In another aspect the present invention consists in a method of remediating a chemically contaminated matrix, said method comprising the steps of
ensuring the matrix with any contamination is at least substantially dry,
milling the at least substantially dry matrix and any contaminating content in milling apparatus of any of the kinds previously described, and
harvesting the solid stream from the milling apparatus.

Preferably matrix itself or any solids stream thereof is not subjected to washing:

Preferably the milling involves one or more reagent (e.g. quartz sand) and optionally any catalyst that may be considered desirable. Preferably the milling apparatus involves balls and preferably those balls are of steel but they can be of any other suitable impact material.

Preferably the milling apparatus is confined so as to reduce noise levels (e.g. in a transport container e.g. a 20 foot ISO container).

Optionally an inert gas or an oxygen low gas can be provided as the environment for the milling apparatus (e.g. by a nitrogen infusion).

Optionally a rotary drier is used to ensure the dryness of the matrix.

Optionally there can be dust and/or gas capture from any such drying apparatus.

Preferably there can be dust capture from any such harvesting stage or discharge from the milling apparatus.

In still a further aspect the present invention consists in the use of milling apparatus of any of the kinds previously described as the present invention.

In another aspect the invention is a procedure for remediating soil by subjecting a substantially dry solids stream of the soil, or a partitioned amount thereof, to milling so as to dislocate-Si—O— bonds of the soil and/or any added quartz or the like material(s) thereby to facilitate and/or cause breakdown of organohalogen content(s), the milling being in a horizontally shafted ball mill where the shaft has or carries ball agitator forms.

The milled materials may then be blended (e.g. with an oversize material as in the aforementioned specifications).

In yet a further aspect the present invention consists in plant for remediating a matrix, said plant including milling apparatus of any aspect of the present invention.

In yet a further aspect the present invention consists the solids outfeed of a procedure or method as aforesaid.

In a procedure of the present invention preferably ball speeds can be up to 20 metres/per sec and are at least 2 metres/per sec over part of each agitation.

Preferably the output product is submicron prior to any pugmill or other glomeration or blended remediation of the milled output.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE SEVERAL VIEWS OF THE DRAWINGS

Preferred forms of the present invention will now be described with reference to the accompanying drawings in which FIG. 1 show a plant schematic suitable for treating a matrix that is a contaminated soil stockpile, the solid arrows showing the soil flow, FIG. 2 is a perspective view of a gang of shafted chambers in accordance with the present invention each operating as a milling apparatus (the balls or other impact elements not being shown) under the operation of a preferred gang drive and within a sound suppressing containment enclosure, FIG. 3 is a closer detail of a soil and reagent feed hopper each with separate auger feed into the top most shafted chamber.

DETAILED DESCRIPTION OF THE INVENTION

Figure 1:
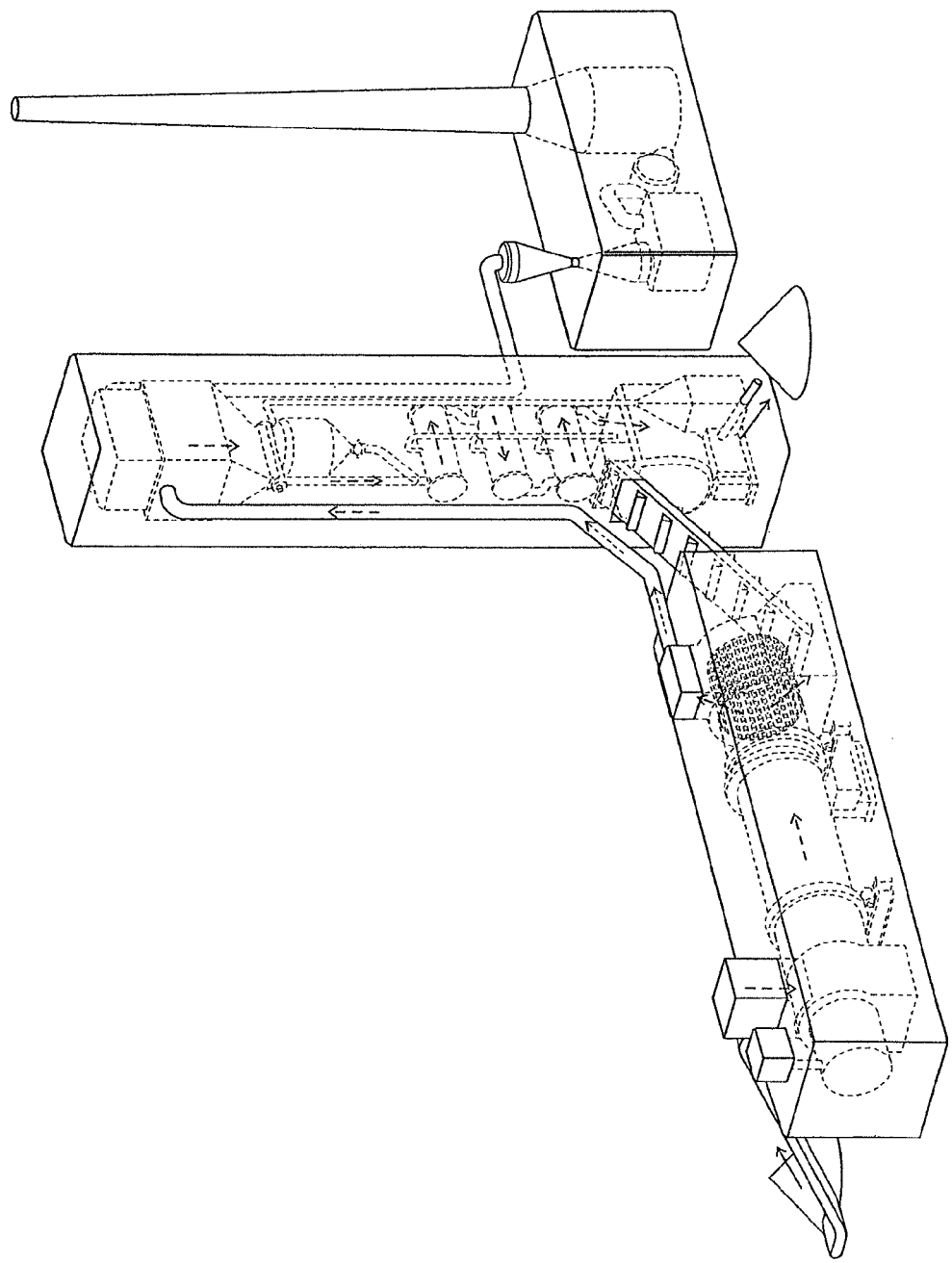
FIG. 1A shows the flow of the plant of FIG. 1.
Figure 1A:
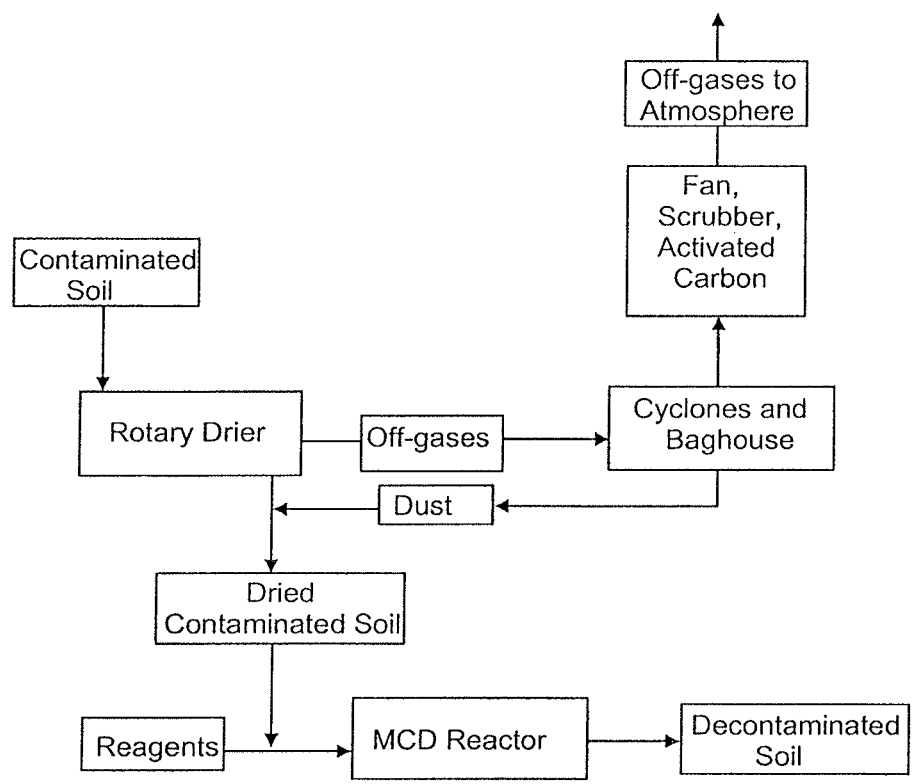

In the preferred form of the present invention a shafted chamber 1 is defined by end plates 2 and 3 of a cylindrical containment 5 for the balls and media. The plates carry there through a shaft 4. As can be seen (at least with the plate 3), preferably there is a bearing support 5 for the shaft 4 from one (and preferably each) end plate.

The drum like surround 5 is preferably provided with a flange connectable feed port 6 on the top at one end and a discharge 7 via the plate at the other end. Alternatively a downwardly directed flanged outlet could be provided from at or adjacent the region 8.

As can be seen a plurality of staggered forms 9 are positioned to rotate in unison with the shaft 4 as it is rotated. This has the effect of agitating the balls (not shown) which partly fill the containment area of the chamber.

Optionally a vent port 10 (preferably flanged) can be provided, e.g. to allow dust and/or gaseous environment control. FIG. 2 shows a series of 4 shafted chambers driven under a ganged drive of belts or other flexible drives whereby, if desired, a nitrogen or other inert gas supply 15 can provide for an inert atmosphere in each of the chambers.

As can be seen in FIG. 3 hoppers 11 and 12 can feed via augers 13 and 14 respectively into an inlet 6 of a top most shafted chamber 6 as shown.

The milled or being milled material(s) then passes down via the lower shafted chambers prior to the dumping from the lower most shafted chamber 16 into a pugmill 17 where the materials are, at least to some extent, agglomerated under the action of a water infeed 18.

The pugmill arrangement at the bottom of the tower has the purpose of treating/processing the soil that has been subjected to the milling action of the gang of ball agitating shafted chambers and any reagents deemed desirable. There is provided ducting 100 between inlets and outlets whereby there is a pathway for transmissions of material from outlet to inlet between chambers.

Figure 5:
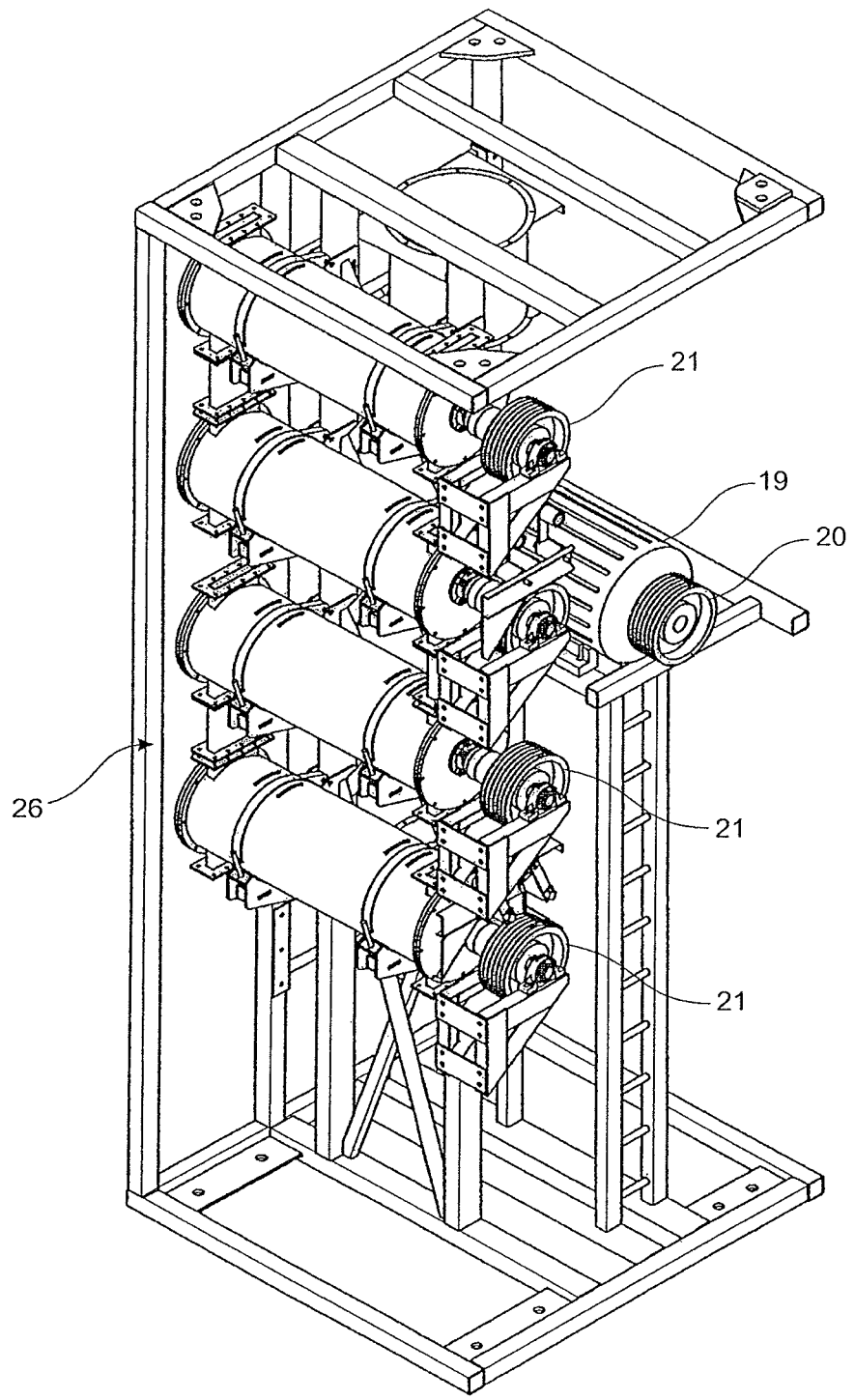
FIG. 5 is a perspective view of the apparatus of FIG. 2 showing the drive pulleys preferred in conjunction with an electric motor, the gang of shafted chambers being supported from a tower frame.
Figure 6:
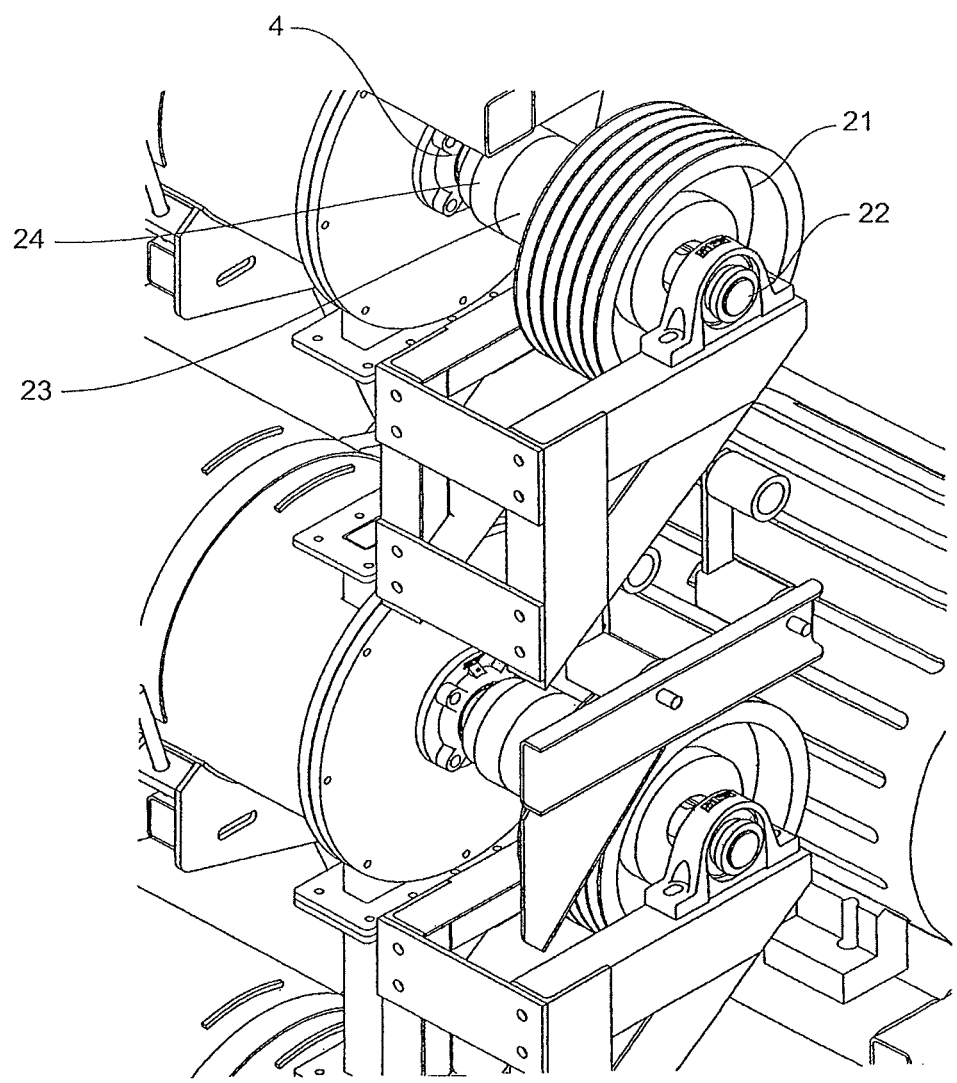
FIG. 6 is a closer view of two proximate parts of the gang shown in FIG. 5.

FIG. 5 shows the arrangement of FIG. 2 where an electric motor 19 drives a drive pulley to be linked to each of the driven pulleys 21.

A feature of the arrangement as described is the ability for a sound suppressing confinement 25 by a transportation container about the tower structure 26 of FIG. 5 to keep noise levels generally low while still providing an outlet from the enclosure 25.

As can be seen in FIG. 1 there is a flow through of the soil stockpile through preferably a rotary drier and from thence up a feed to the hopper 11 at which stage any reagents can be mixed therewith at the entry into the topmost shafted chamber 6.

Figure 4:
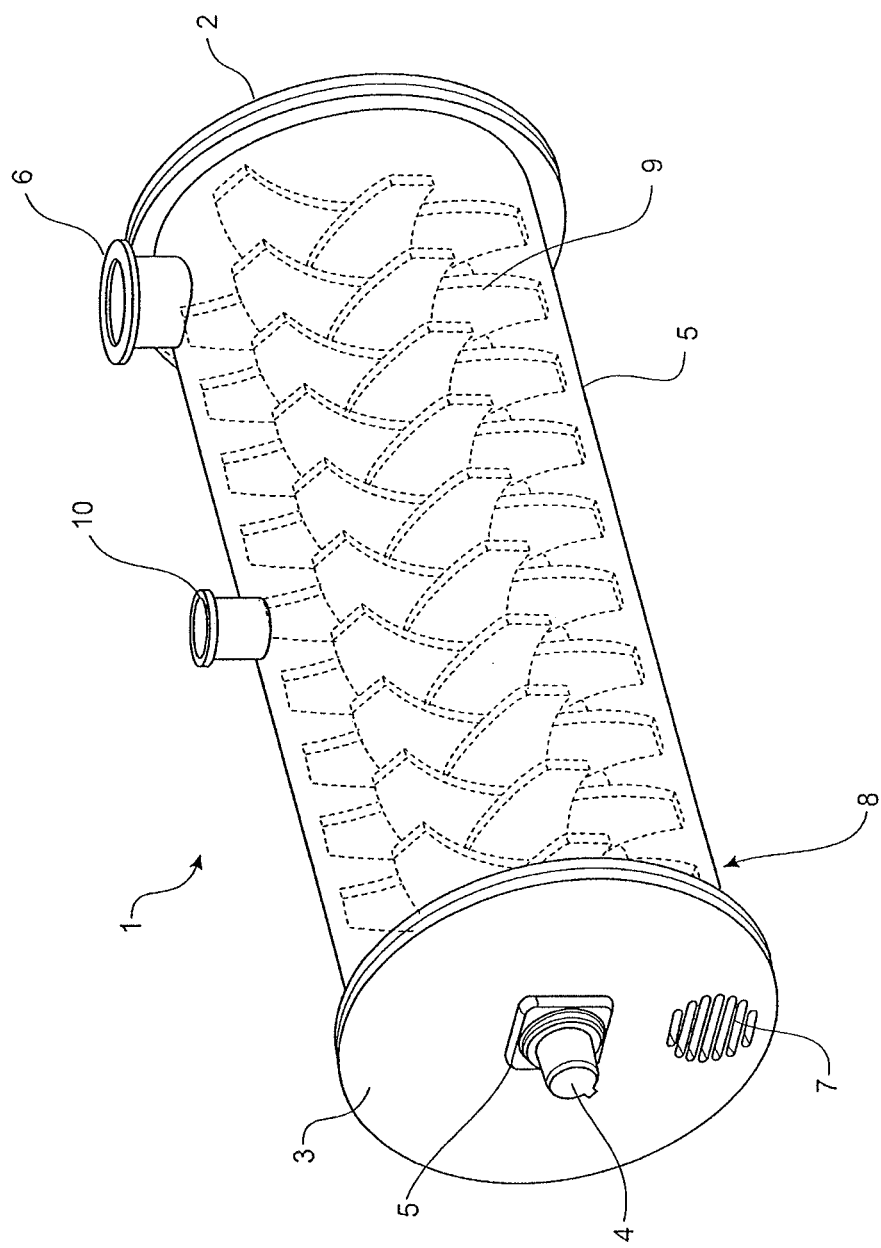
FIG. 4 is a close up of a shafted chamber showing a top feed point at or adjacent one end and an outlet at the other end from whence there can be a feed down to a feed in part of a reversed but preferably in line milling apparatus of the same kind thereby to reverse the flow direction as the chambers alternate, thereby reducing the footprint of the plant.

In preferred forms of the present invention each impact/flinger form on a shaft is cast or fabricated (for example with a hexagonal, square or octagonal sleeve) to be sleeved in a non rotatory manner on the shaft 4 so that the stagger between such elements as shown in FIG. 4 is perpetuated irrespective of rotational use and rotational direction. Reverse driving can double impact form life.

Operation of the plant can be by any of the methods and procedures described in the aforementioned patent specifications; it can alternatively be a reagentless milling or can involve reagents, e.g. quartz and any optional catalyst. The important feature is to monitor this through put so that it is appropriate that where reagents are required, they are in fact used to ensure the desired monitored outcome.

Figure 7:
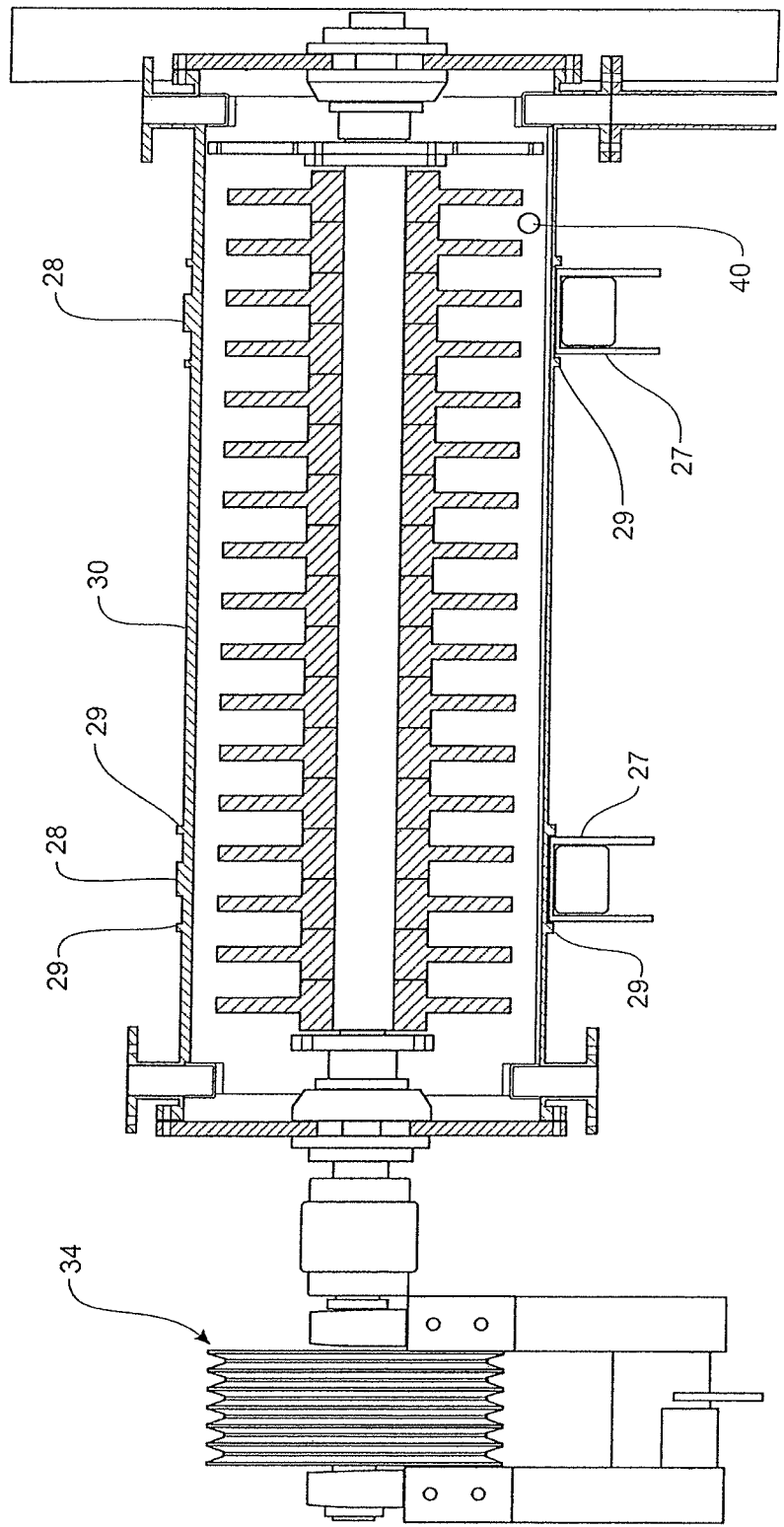
FIG. 7 is a diagrammatic section of apparatus of the present invention (not showing the balls for clarity, the balls (e.g. of a size mentioned in the previously mentioned specifications) being at least to about the shaft level when static, FIG. 8 is a ready to go milling apparatus of a kind coupled in FIG. 7, FIG. 9 shows the cradle and drive coupler that remains when the apparatus of FIG. 8 has been removed, FIG. 10 shows the coupler in section (e.g. ATRA-FLEX™ flexible coupling available in New Zealand—www.johnbrooks.co.nz/couplingshtm, and FIG. 11 shows a flow diagram of a heavy metal stabilising regime for milled soils that can extend the value of the milling to reduce organic contamination.
Figure 8:
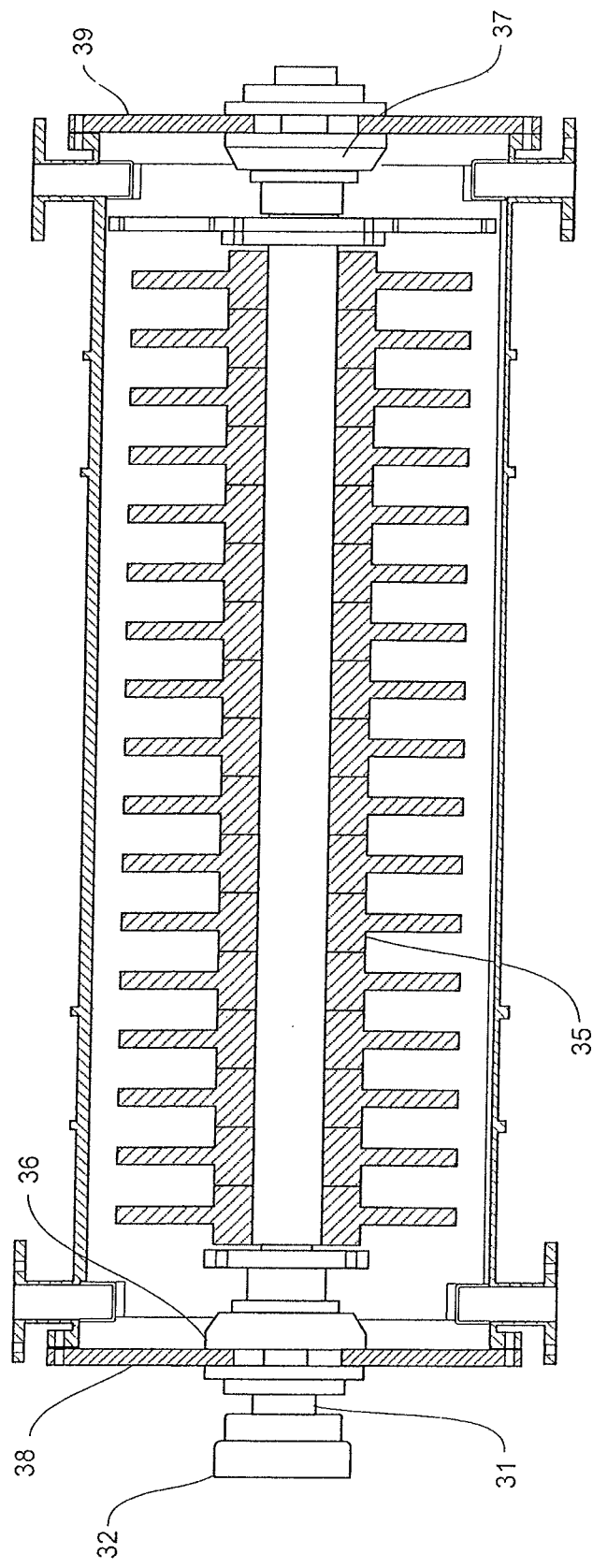
Figure 9:
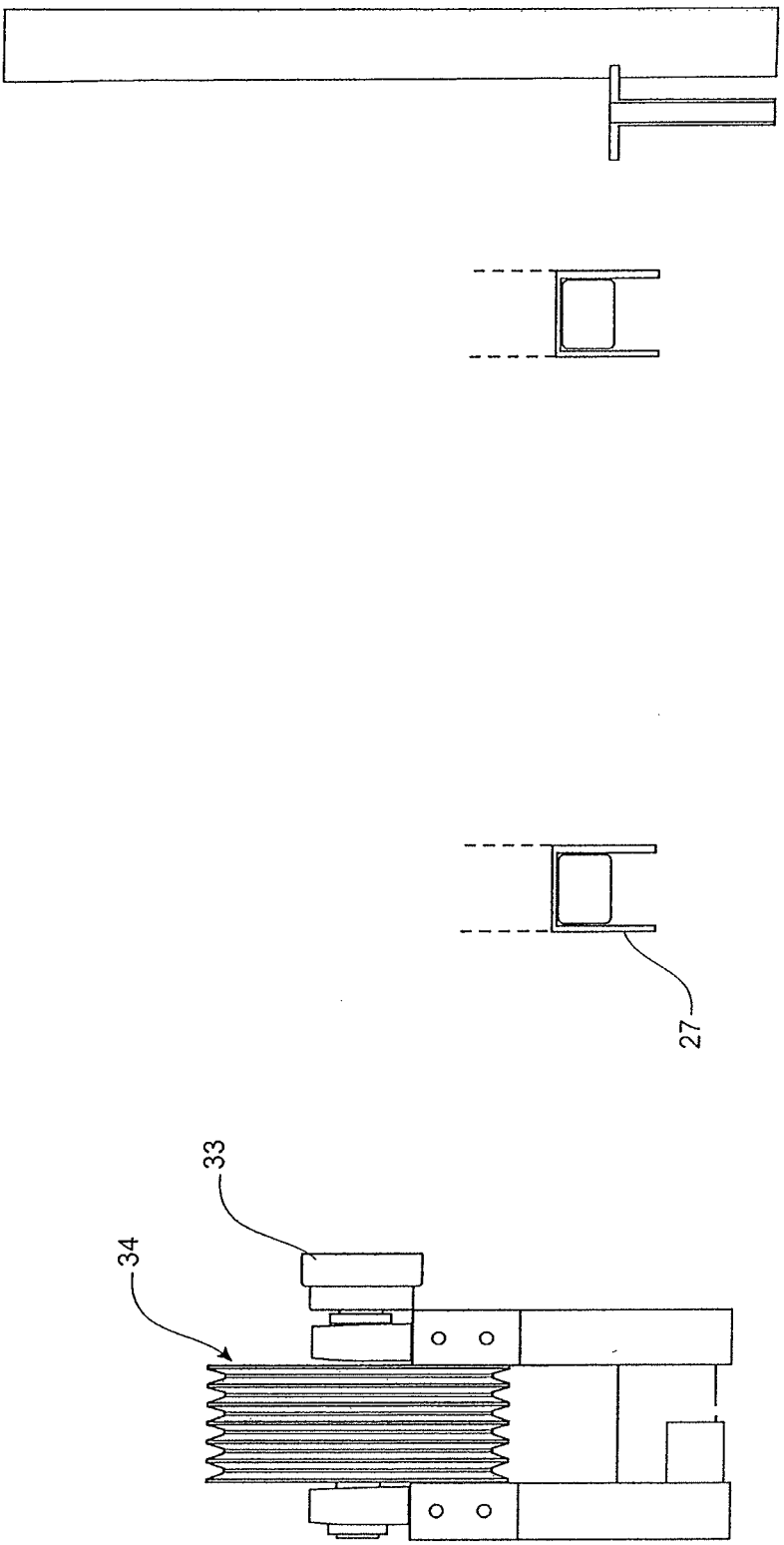
Figure 10:
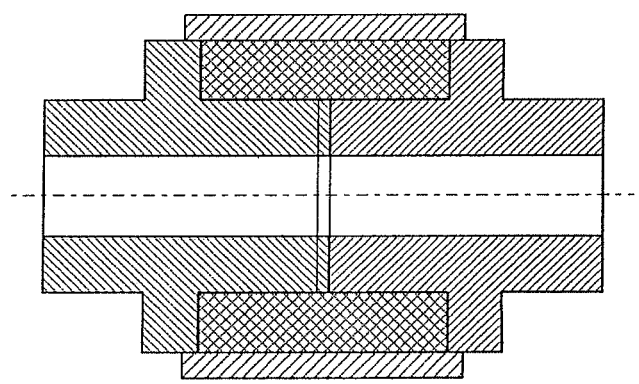

FIGS. 7 through 9 show in stylised section firstly the assembly as in a stack with a cradle 27 having belted thereto (steel belting 28) between guides 29 of the chamber or drum 30 thereby to stablise the same with the shaft 31 aligned appropriately for coupling by its coupler 32 to the coupler 33 on the pulley shaft of the drive arrangement 34 shown. Shaft 31 is preferably hexagonal inside hexagonal sleeves of each impactor/flinger form 35 and is bearing mounted at 36 and 37 in plates 38 and 39.

FIG. 8 shows the removable milling unit that is ready to go (showing only one ball 40 of the many balls to be therein) whilst FIG. 9 shows the residue of the mount and drive after removal of that part shown in FIG. 8 from the assembly shown in FIG. 7.

It can be seen there is a stably supported pulley shaft if a pulley is to be belt driven and that shaft carries the coupler from which the coupler carried by the shaft of the drum or chamber on its bearings is to be aligned reliance preferably on the cradle.

This enables "ready to go" replacements to be quickly refitted in two hours or less during any maintenance period. Simple cradle/belting, coupling, flange bolting allows the drive and flow paths to be made good.

Preferably milled materials have a final particle size of less than 100 microns, preferably very much less e.g. sub 1 micron.

Figure 11:
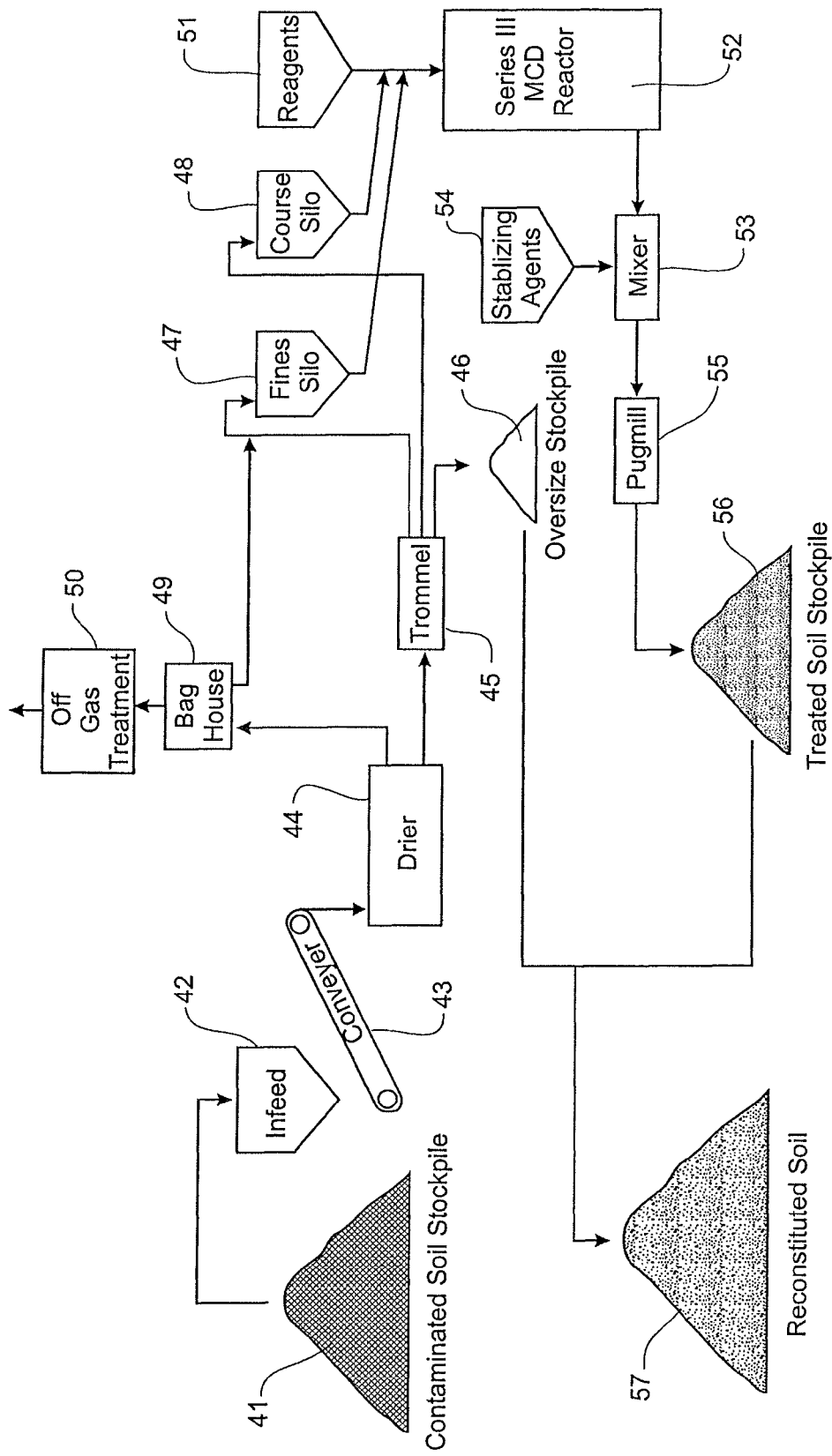

FIG. 11 shows the soil remediation flow as preferred in the remediation process subject to our patent application filed simultaneously herewith. The blending (e.g. in a concrete type mixer or other) tares advantage of the preferred submicron post milling particle size, where metallic impurities are, for better stabilisation against leaching or translocation of those metallic values.

FIG. 11 as a flow diagram shows a preferred flow diagram where a contaminated soil stockpile 41 is fed as an infeed into a hopper 42 and from thence to a conveyor 43. The contaminated soil is then passed into a rotary drier or other (Met 44 from whence it is passed via a trommel 45 as an oversize stream to an oversize stockpile 46. The non oversize stream is separated two ways with fines passing into a fines silo 47 and coarser materials into a coarse silo 48.

Dust and vapours of the drier 44 pass through a bag house 49 and, after off gas treatment at 50, there is venting to atmosphere. Moreover recovered fines at the bag house 49 are fed to the fines silo 47.

The fines and coarse streams of 47 and 48 respectively are fed with milling reagents in hopper 51 into the milling apparatus 52 which preferably is a stack of "ready to go" mills (collectively as a "reactor") as previously stated. This reactor is to be known as a Series III MCD™ reactor. It feeds the milled materials to a mixer 53 into which is added the stabilising agents from a hopper feed 54. The output from the mixer 53 then passes via a plug mill 55 thereby to provide a treated soil stockpile 56. Materials of the oversize stockpile 46 that have not been milled and the (usually submicron) materials of the treated soil stockpile 56 can then be blended by any appropriate mixing (e.g. a concrete mixer or otherwise) to provide a reconstituted soil stockpile or the equivalent 57.

The person skilled in the art will appreciate how metal values in their existing, but usually a different form, can be stabilised with a choice of appropriate stabilising agents in hopper 54. Such stabilisation preferably reduces leaching by virtue of the metal values being held physically and/or preferably in an insoluble form.

The present invention provides alternative to existing procedures.

What we claim is:

1. A milling apparatus comprising
a first removable housing defining a first chamber having an inlet and an outlet, having an at least substantially horizontal shaft rotatably driveable from externally of the first chamber, having first removable agitator formations of or carried by the shaft within the first chamber, and having impact masses confined in the first chamber and energizable within the first chamber upon rotation of the shaft and the first agitator formations,
a second removable housing defining a second chamber having an inlet and an outlet, having an at least substantially horizontal shaft rotatably driveable from externally of the second chamber, having second removable agitator formations of or carried by the shaft within the second chamber, and having impact masses confined in the second chamber and energizable within the second container upon rotation of the shaft and the second agitator formations, the inlet of the second chamber being adapted to receive material from the outlet of the first chamber,
a third removable housing defining a third chamber having an inlet and an outlet, the inlet of the third chamber being adapted to receive material from the outlet of the second chamber, and having a shaft rotatably driveable from externally of the third chamber, having third removable agitator formations of or carried by the shaft within the third chamber, and having impact masses confined in the third chamber and energizable within the third chamber upon rotation of the shaft and the third agitator formations to impact material received through the inlet, the inlet of the third chamber being adapted to receive material from the outlet of the second chamber, and
one fourth removable housing defining a fourth chamber having an inlet and an outlet, having a substantially horizontal shaft rotatable in the fourth chamber having agitator formations of or carried by the shaft in the fourth chamber and having impact masses confined in the fourth chamber and energizable within the chamber upon rotation of the shaft and the agitator formations, the inlet of the fourth chamber being adapted to receive material from the outlet of the third chamber, and wherein the first, second, third and fourth housings are each supported on a cradle mount assembly on which each shaft receives a drive to rotate each said shaft;

wherein there is in close proximity a pug mill blender and the outlet of the last of the chambers discharges continuously to the pug mill blender.

2. The milling apparatus of claim 1, wherein each chamber is arrange at a position so that the each chamber discharges via its outlet assisted by gravity and each chamber receives material via its inlet assisted by gravity.

3. The milling apparatus of claim 1, wherein said chambers are at least substantially horizontally aligned cylindrical chambers each with a top inlet near one end and a bottom outlet near the other end.

4. The milling apparatus of claim 1, wherein a containment structure located atop all housings and the containment structure allows single or multiple infeeds to enter the housings via its inlet or via inlets.

5. A plant for milling material comprising the milling apparatus as defined in claim 1.

* * * * *